(12) United States Patent
Lafferty, III et al.

(10) Patent No.: US 8,806,833 B2
(45) Date of Patent: *Aug. 19, 2014

(54) STRUCTURAL REINFORCING SYSTEM COMPONENTS

(71) Applicants: George A. Lafferty, III, Roeland Park, KS (US); Ronald E. Lafferty, Kansas City, KS (US); David C. Mascal, Mission, KS (US)

(72) Inventors: George A. Lafferty, III, Roeland Park, KS (US); Ronald E. Lafferty, Kansas City, KS (US); David C. Mascal, Mission, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,077

(22) Filed: Jan. 27, 2014

(65) Prior Publication Data

US 2014/0137485 A1 May 22, 2014

Related U.S. Application Data

(63) Continuation-in-part of application No. 13/710,266, filed on Dec. 10, 2012, now Pat. No. 8,635,820, and a continuation of application No. 11/500,120, filed on Aug. 7, 2006, now Pat. No. 8,327,592.

(60) Provisional application No. 60/706,195, filed on Aug. 5, 2005.

(51) Int. Cl.
| | |
|---|---|
| *E04B 1/346* | (2006.01) |
| *E06B 3/26* | (2006.01) |
| *E04C 2/52* | (2006.01) |
| *E04C 2/34* | (2006.01) |
| *E04C 2/32* | (2006.01) |

(52) U.S. Cl.
USPC .................. 52/630; 52/64; 52/202; 52/220.2; 52/481.1

(58) Field of Classification Search
CPC ............. E04B 1/26; E04B 1/92; E04B 2/707; E04B 2001/2696; E04H 9/14; E06B 9/02; E06B 2009/005; E06B 2009/02
USPC ............. 52/630, 481.1, 764, 284, 696, 656.1, 52/220.8, 169.7, 169.8, 220.1, 220.2, 52/293.3, 64, 202
See application file for complete search history.

(56) References Cited

U.S. PATENT DOCUMENTS

| | | | | |
|---|---|---|---|---|
| 1,708,394 | A | * | 4/1929 | Mugler ........................... 52/630 |
| 3,055,460 | A | | 9/1962 | Maroney |
| 3,064,770 | A | * | 11/1962 | Crampton ........................ 52/630 |
| 4,650,085 | A | * | 3/1987 | Davies et al. ................. 220/4.02 |
| 4,833,845 | A | * | 5/1989 | Bruckner et al. ............. 52/126.6 |
| 4,862,667 | A | * | 9/1989 | Melland ........................... 52/847 |
| 6,219,973 | B1 | | 4/2001 | Lafferty |

(Continued)

*Primary Examiner* — Ryan Kwiecinski
(74) *Attorney, Agent, or Firm* — Erickson Kernell Derusseau & Kleypas, LLC

(57) ABSTRACT

A structural reinforcing panel system for reinforcing a structure against lateral or shear and uplift loads. The system includes a structural reinforcing panel which is installed between the studs in a wall of the structure. The panel is connected to the foundation of the structure and the sill or header. Two or more panels may be connected together at a corner, within a wall, ceiling or floor. The roof rafters of the structure may be attached to a top plate bracket mounted to the sill plate, which may also be connected to one or more structural reinforcing panels, provides uplift load support for the structure. Movable reinforcing panels may be used to barricade openings in the building structure such as windows. For structures built on piers, a pier mount bracket provides a linkage to one or more structural reinforcing panels.

6 Claims, 10 Drawing Sheets

(56) References Cited

U.S. PATENT DOCUMENTS

| | | |
|---|---|---|
| 7,673,422 B2 | 3/2010 | De La Marche |
| 8,327,592 B2 * | 12/2012 | Lafferty et al. ............... 52/293.3 |
| 8,635,820 B2 * | 1/2014 | Lafferty et al. ............... 52/293.3 |
| 2002/0038533 A1 * | 4/2002 | Potter et al. .................... 52/634 |
| 2003/0041551 A1 * | 3/2003 | Boone et al. .................... 52/698 |
| 2003/0042371 A1 * | 3/2003 | McCahill et al. ................ 248/57 |
| 2003/0230042 A1 * | 12/2003 | Rhodebeck et al. ......... 52/481.1 |
| 2006/0143998 A1 * | 7/2006 | Timmerman et al. ........ 52/293.3 |
| 2007/0107328 A1 * | 5/2007 | Munch ............................ 52/202 |
| 2013/0025222 A1 * | 1/2013 | Mueller ....................... 52/293.3 |

\* cited by examiner

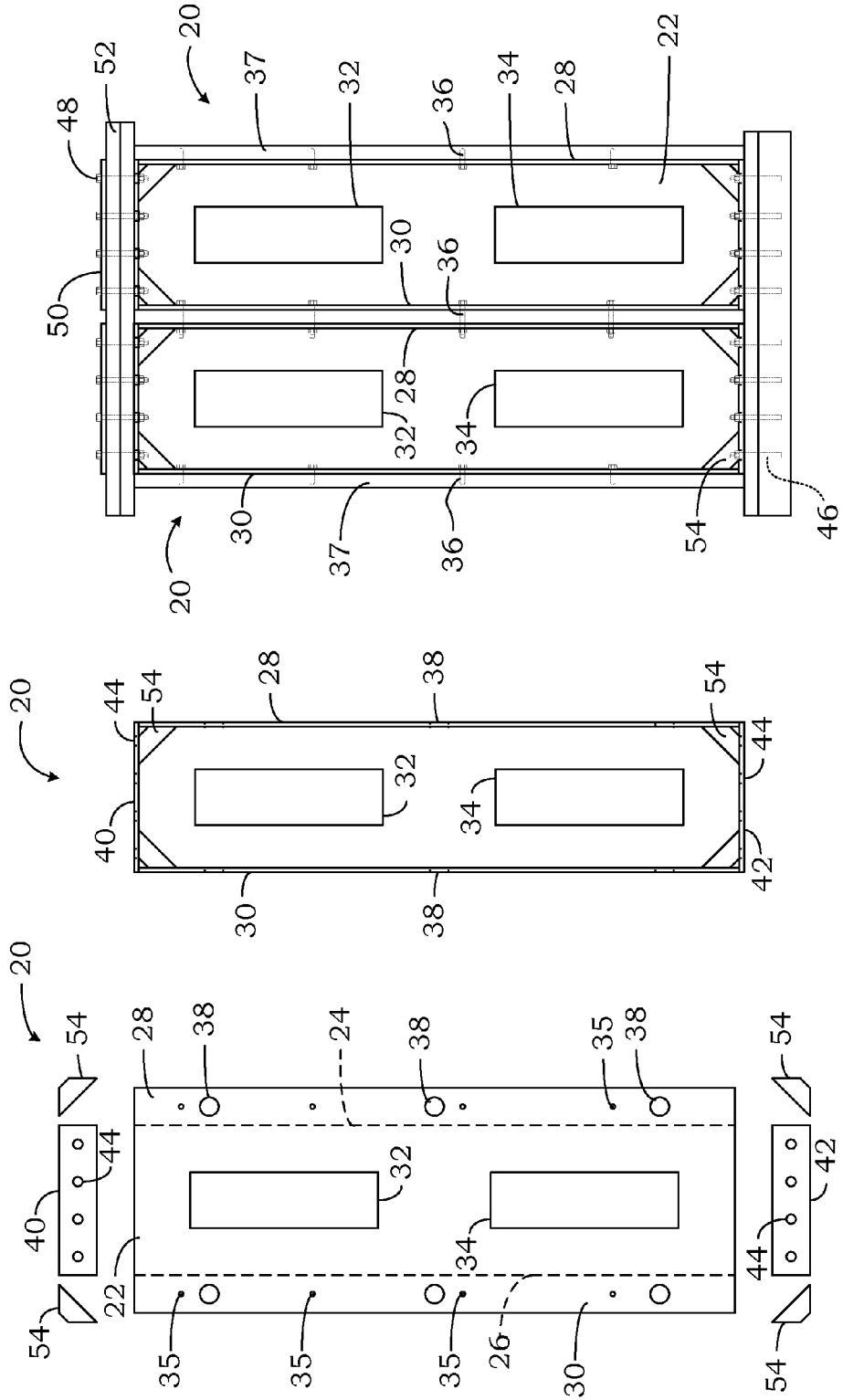

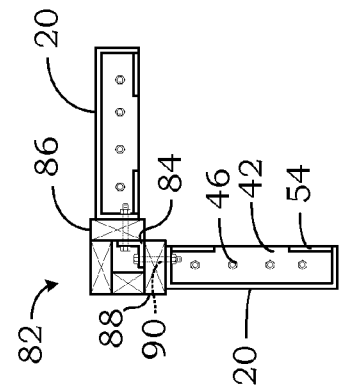
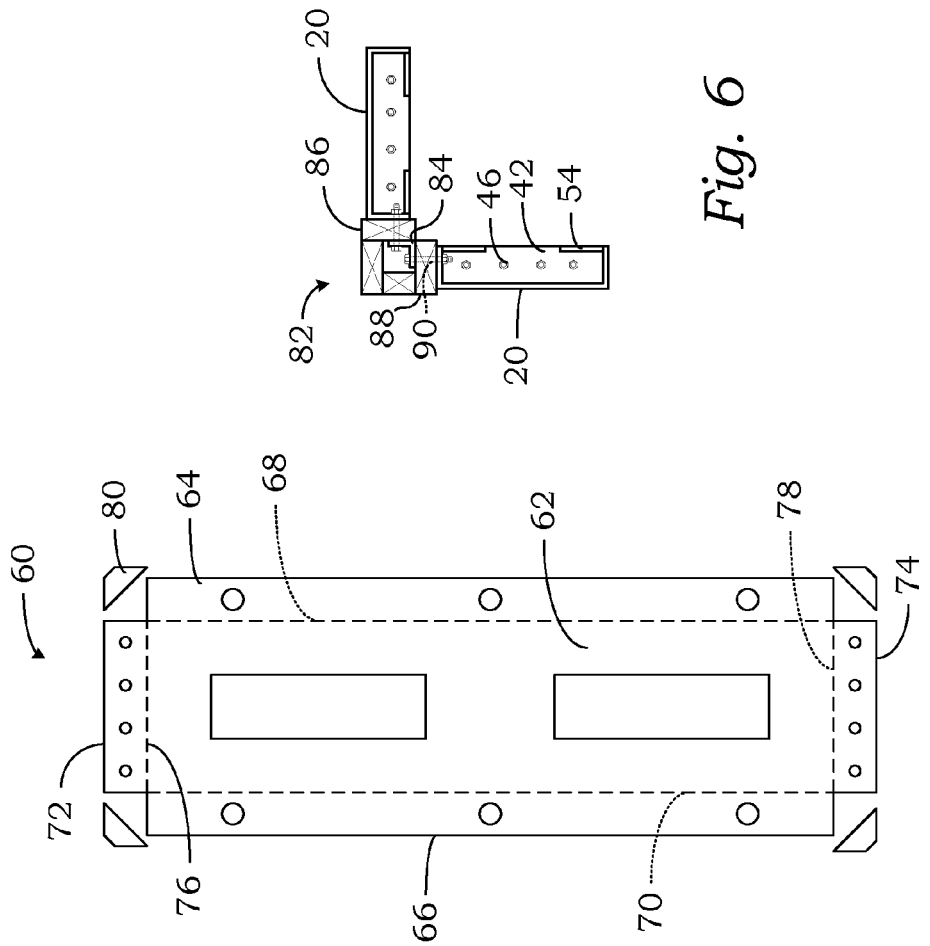
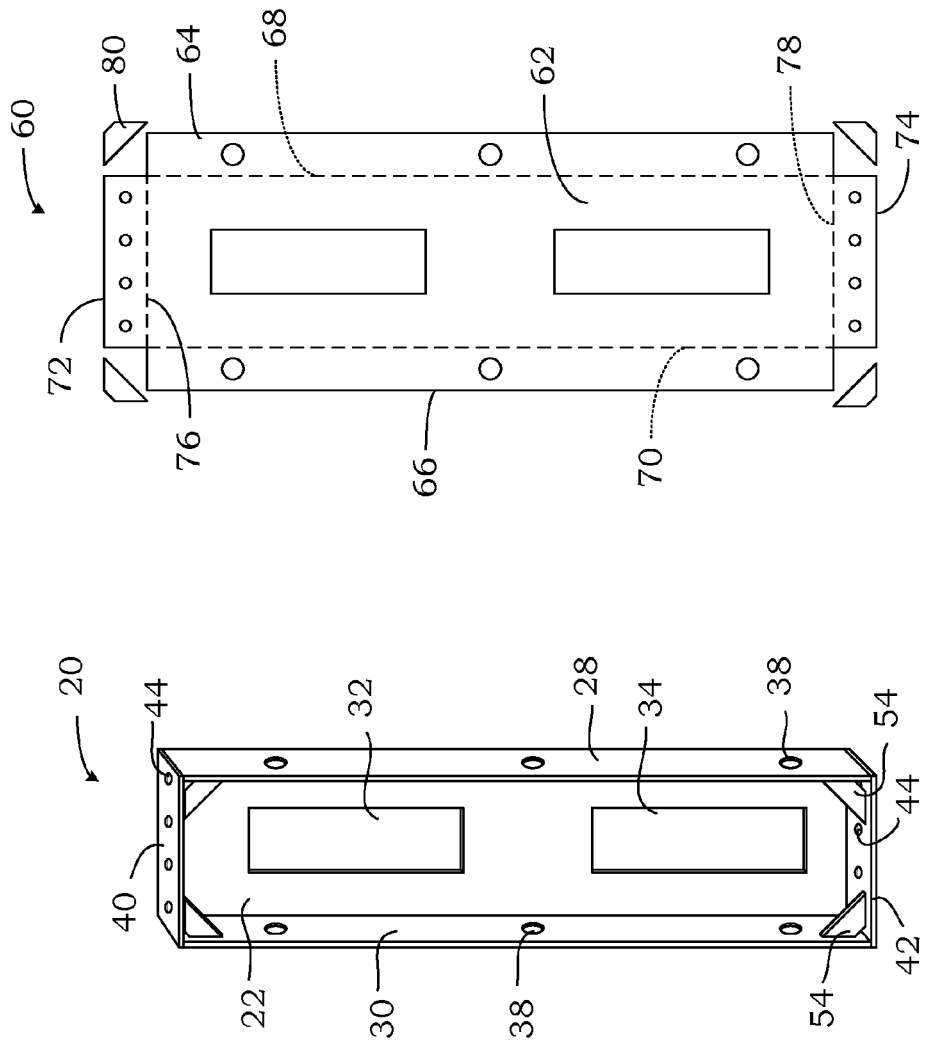

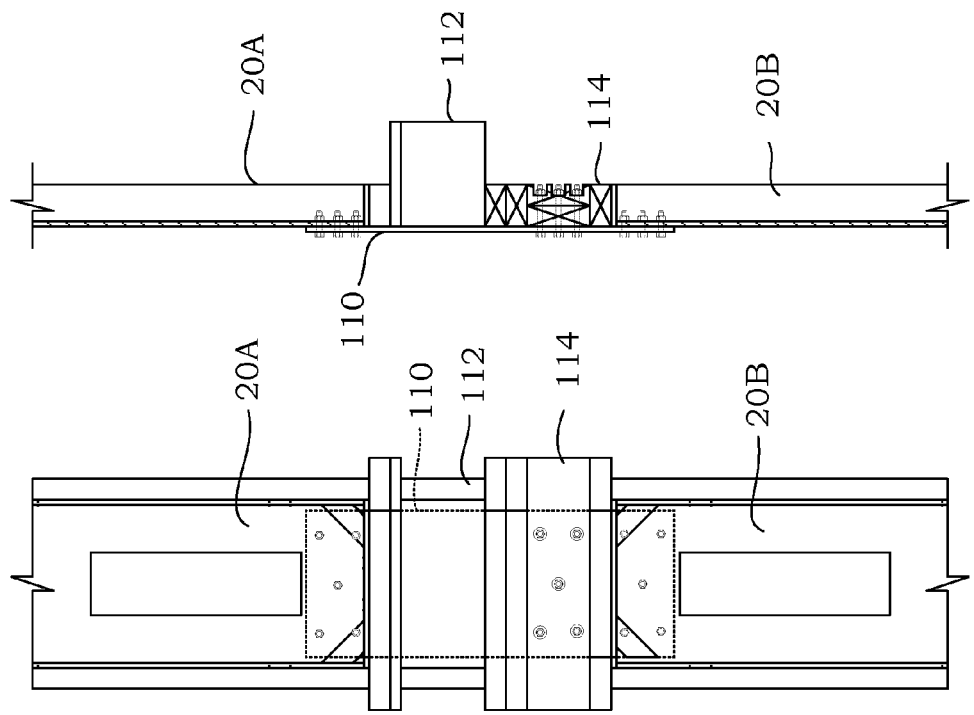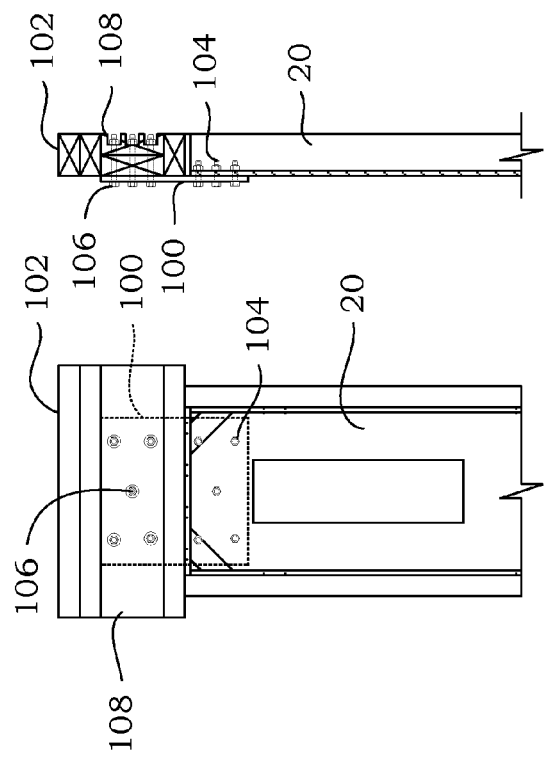

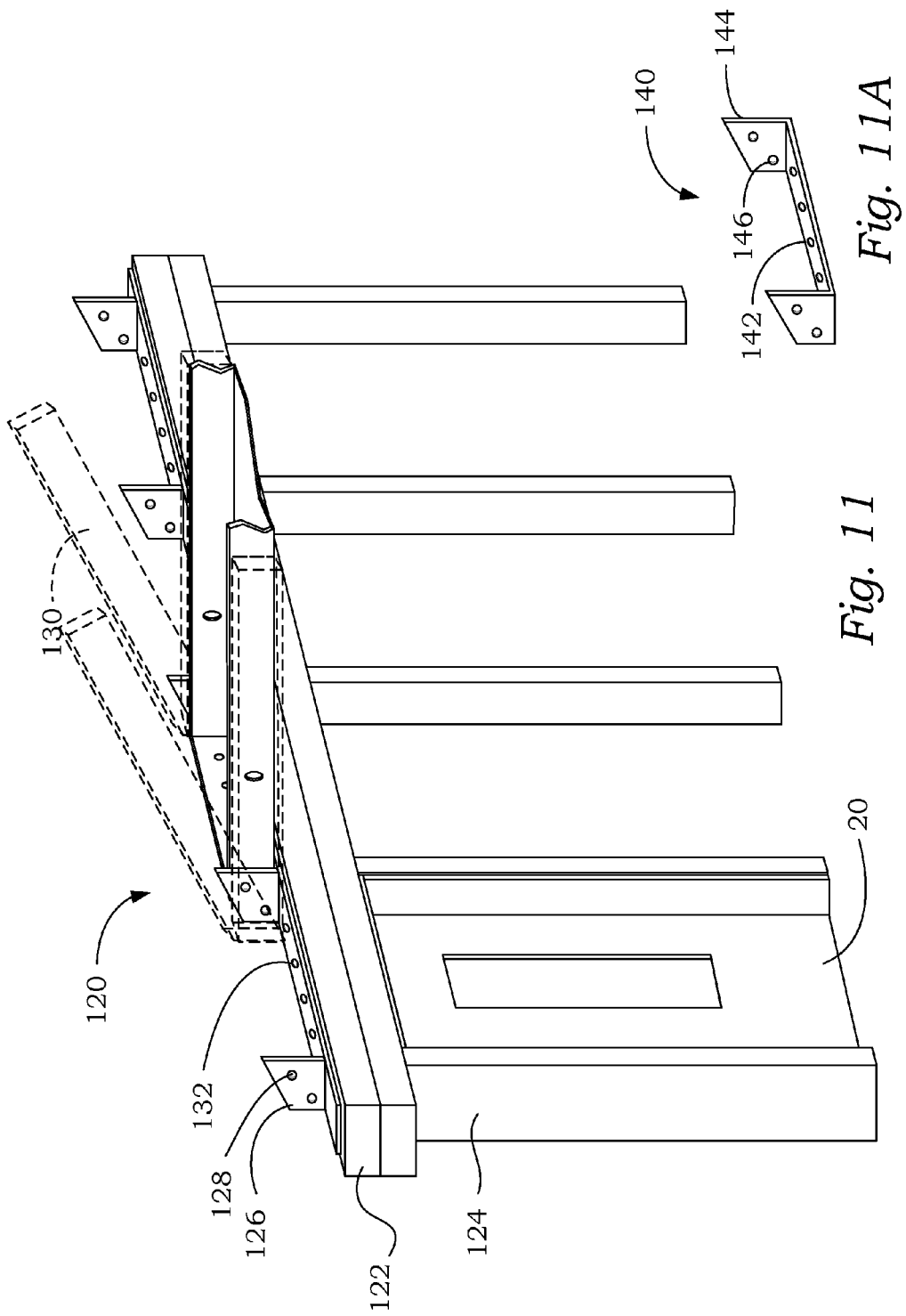

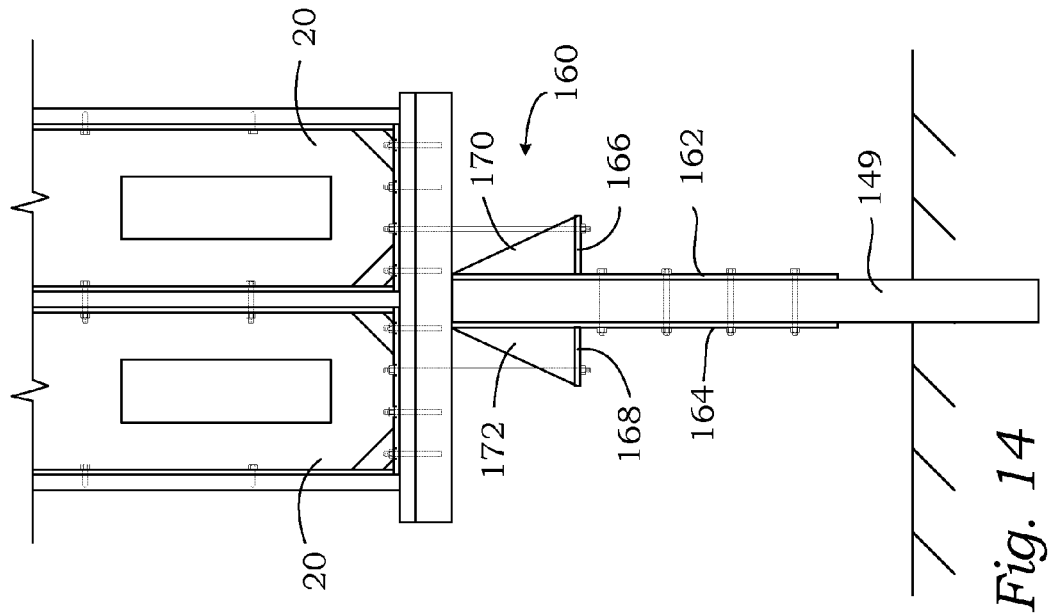
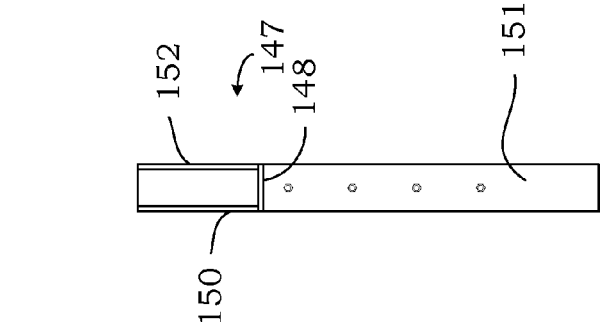
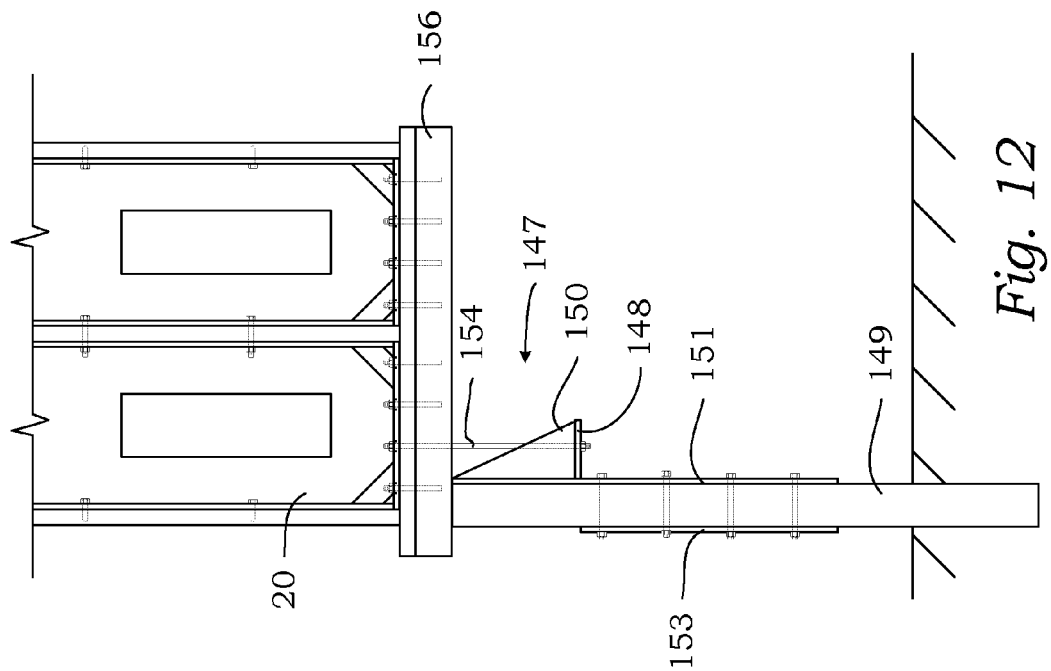

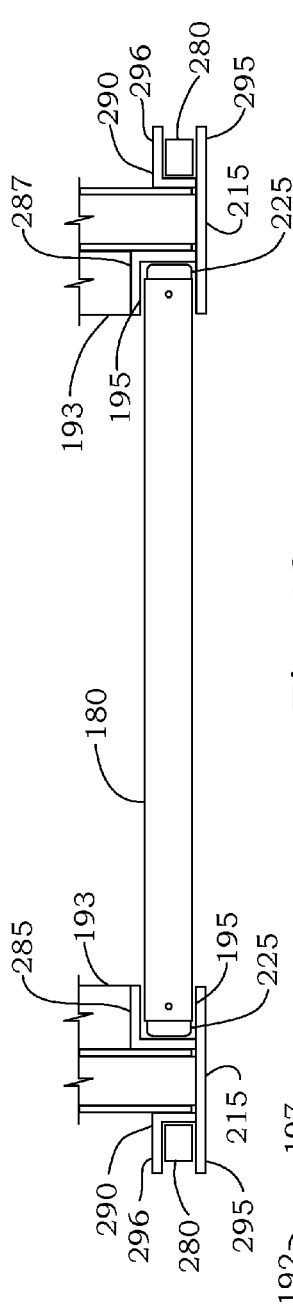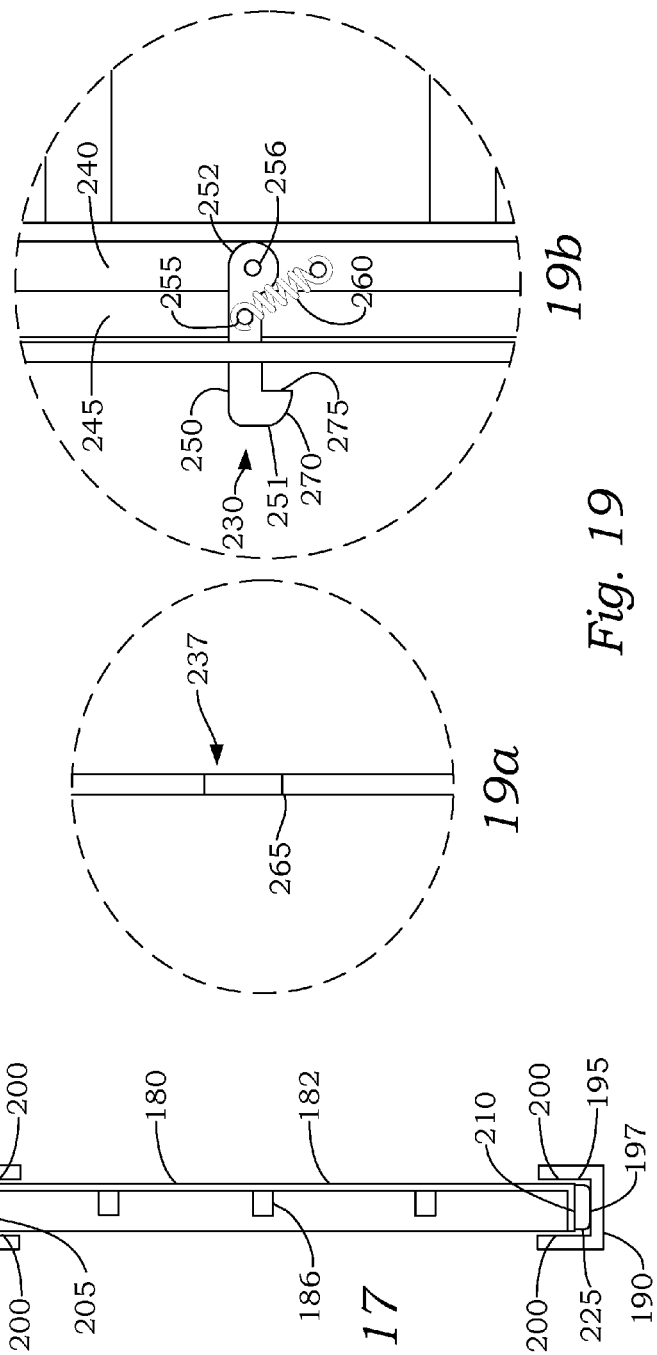

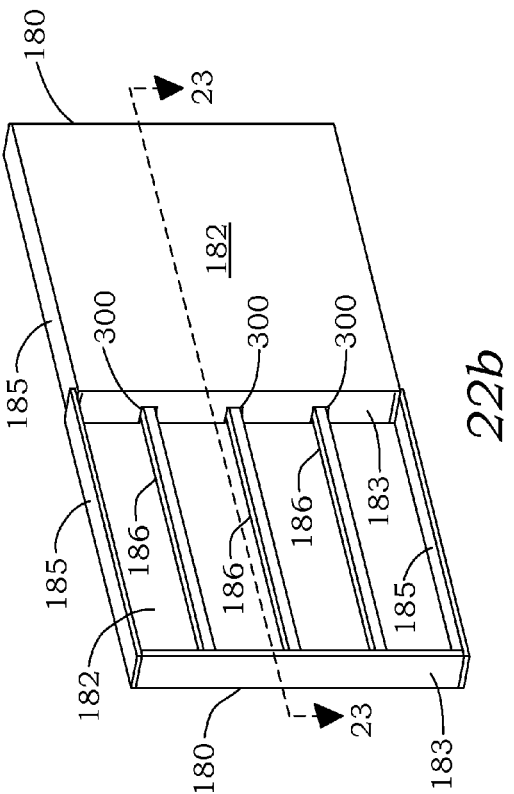
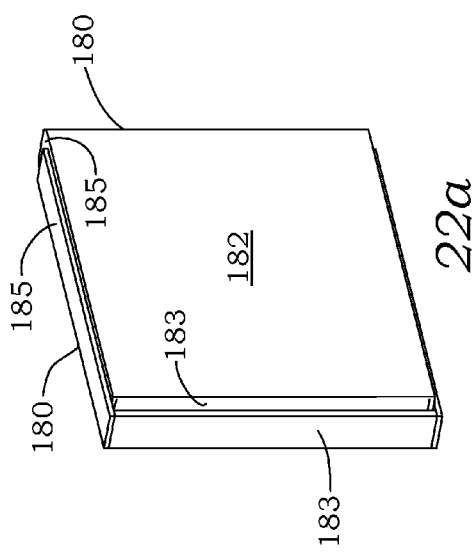
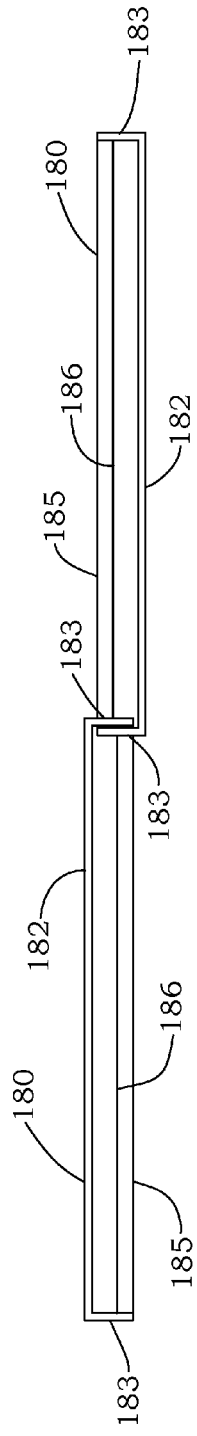
Fig. 22
Fig. 23

STRUCTURAL REINFORCING SYSTEM COMPONENTS

CROSS REFERENCE TO RELATED APPLICATIONS

This application is a continuation-in-part of application Ser. No. 13/710,266, filed Dec. 10, 2012, entitled STRUCTURAL REINFORCING SYSTEM COMPONENTS, which is now U.S. Pat. No. 8,635,820. U.S. Pat. No. 8,635,820 is a continuation of application Ser. No. 11/500,120, filed Aug. 7, 2006, entitled STRUCTURAL REINFORCING SYSTEM COMPONENTS, which is now U.S. Pat. No. 8,327,592. Application Ser. No. 11/500,120 claims the benefit of provisional application Ser. No. 60/706,195, filed Aug. 5, 2005.

FIELD

The present invention relates to structural components for buildings and, more particularly, to components of a structural reinforcing system for reducing the affects of shear and uplift forces on a building structure.

BACKGROUND

The majority of the buildings in the United States are residential or low-rise commercial buildings consisting of a wood frame or light-steel frame structure with wood or composition sheathing. The structure is designed to withstand the anticipated loading conditions such as rain, snow and wind. Forces and loads such as gravity, rain and snow act vertically and typically are generally predictable. Accordingly, structural designs to withstand these forces are readily available.

Lateral or shear and uplift loads such as is caused by wind, storms, hurricanes and tornados are difficult to predict in direction, magnitude and frequency. In a conventional framed building construction, the vertical loads are handled by the frame including studs, joists, rafters, and trusses. The lateral shear loads are dealt with using sheathing attached to the frame. In areas that have a higher risk of severe weather, such as hurricanes along the East and Gulf coasts, two layers of sheathing may be required to withstand the increased potential loads along with rafter clips and cables to prevent the roof from detaching from the framed walls.

SUMMARY

The present invention includes structural reinforcing components to counter lateral shear loads and uplift forces. The components may be used separately or as a system to provide structural integrity as necessary. A structural reinforcing panel includes a back panel, side panels and upper and lower anchor plates. The side panels are fastened to the building structural frame members such as wall studs, ceiling and floor joists or to an adjacent structural reinforcing panel. The lower anchor plate is anchored to the top of a concrete basement wall, a concrete footing, or a pier mounting bracket, for example. The top anchor plate may be connected to the wall header, to another structural reinforcing panel or to a top plate truss mount. The top plate truss mount may include a top sill plate and a series of vertical straps connected to the rafters of the roof. The structural reinforcing panel may be mounted in the ceiling of a room in conjunction with panels mounted in the walls to provide a safe room within a wood-frame structure, for example.

Structural reinforcing panels may also be movable and installed on tracks proximate windows or other openings in walls, ceilings or floors. Movable panels may utilize rollers or similar mechanisms to allow panels to be moved into place along a track to barricade windows or openings when desired. Movable panels may be installed within pockets proximate the opening to be covered so the panels can be stored out of sight when not in use. A panel that has been moved into position over an opening can be locked into place with a pivoting locking mechanism.

BRIEF DESCRIPTION OF THE DRAWINGS

FIG. 1 is a plan view of the structural reinforcing panel of the present invention prior to assembly.

FIG. 2 is a front elevation view of the structural reinforcing panel of FIG. 1 formed and assembled.

FIG. 3 is a front elevational view of the structural reinforcing panel of FIG. 2 mounted between two wall studs.

FIG. 4 is a perspective view of the structural reinforcing panel of FIG. 2.

FIG. 5 is a plan view of another embodiment of the structural reinforcing panel of the present invention prior to assembly.

FIG. 6 is a top cross sectional view of a corner installation of two structural reinforcing panels.

FIG. 7 is a partial front elevational view of a structural reinforcing panel and a panel mount.

FIG. 8 is a partial side cross sectional view of FIG. 7.

FIG. 9 is a partial front elevational view of two structural reinforcing panels and a floor-to-floor panel mount.

FIG. 10 is a partial side cross sectional view of FIG. 9.

FIG. 11 is a partial perspective view of the structural reinforcing panel and a top plate truss mount.

FIG. 11A is a perspective view of a top plate truss mount bracket.

FIG. 12 is a partial front elevational view of a structural reinforcing panel and a single pier mount.

FIG. 13 is a side view of the single pier mount of FIG. 12.

FIG. 14 is a partial front elevational view of a structural reinforcing panel and a double pier mount.

FIG. 17 is a partial side cross sectional view of FIG. 15.

FIG. 18 is a partial side cross sectional view of FIG. 16.

FIG. 19 is an enlarged partial view of the locking mechanism in FIG. 15.

FIG. 22 is a perspective view of two movable reinforcing panels configured in a telescoping arrangement and shown collapsed (22a) and extended (22b).

FIG. 23 is a cross sectional view of FIG. 22b.

DETAILED DESCRIPTION

Figure 15:
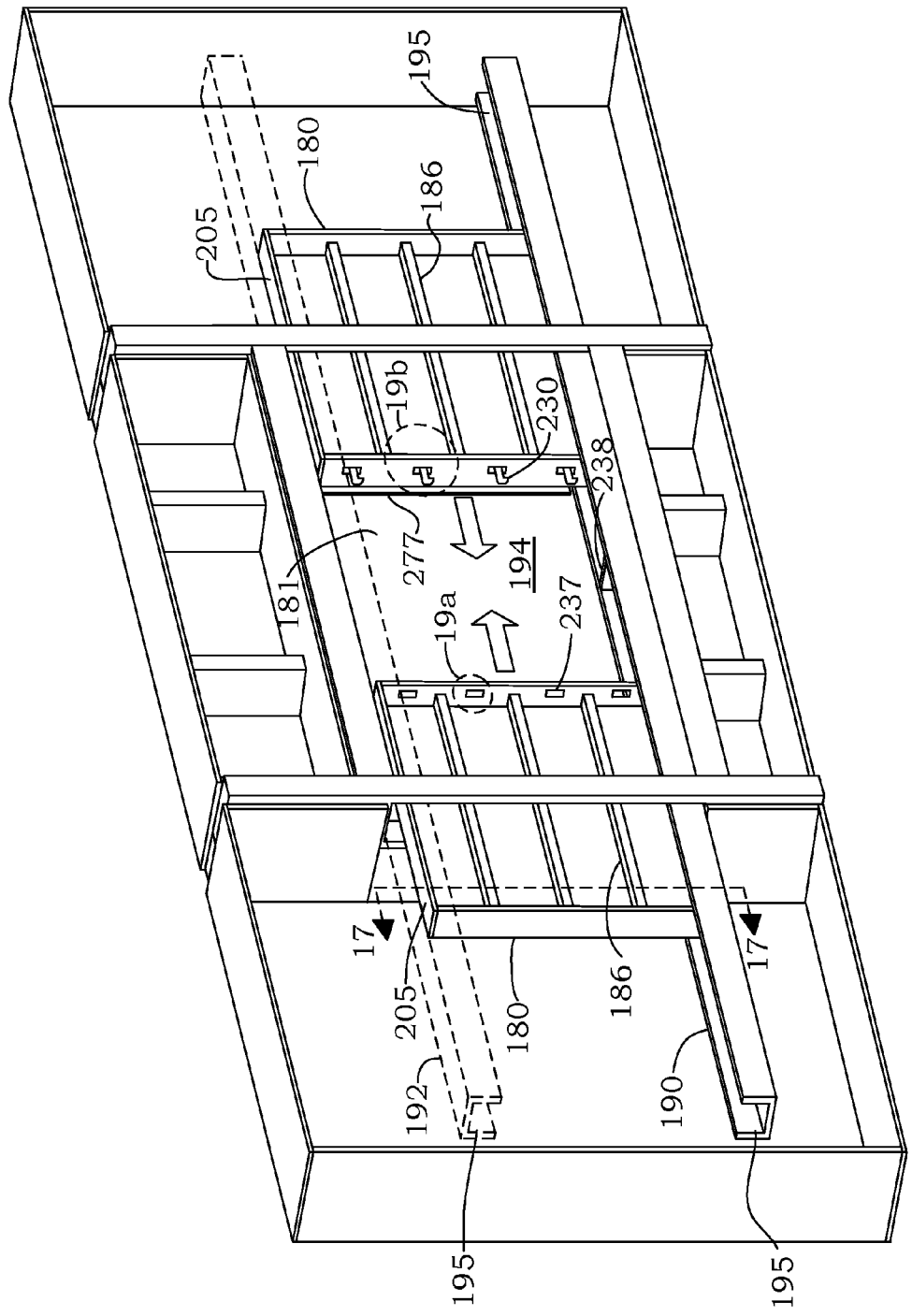
FIG. 15 is a perspective view of two movable reinforcing panels configured to move horizontally to cover a window.

Referring to FIGS. 1-4, a structural reinforcing panel is generally indicated by reference numeral 20. Structural reinforcing panel 20 may be assembled from the various parts shown in FIG. 1 formed in part from cold or hot rolled steel. Structural reinforcing panel 20 includes a back panel 22 which is folded along lines 24 and 26 to form side panels 28 and 30 to form a tray or channel. The back panel 22 has two cutouts 32 and 34 which reduce the weight of the structural reinforcing panel 20, make it easier to carry, and the removed material can be used to fabricate the additional components.

The sides 28 and 30 include a plurality of holes 35 for fasteners 36 to attach the panel 20 to framing members 37 or to other panels. When attaching to framing members 37, lag bolts may be used, for example. When attaching to other panels 20, a machine bolt and nut may be used. Cut outs 38 are also provided in sides 28 and 30 for mechanical access such as electrical or plumbing.

Upper 40 and lower 42 anchor plates are preferably welded to the top and bottom of back panel 22 and sides 28 and 30. The anchor plates 40 and 42 include a plurality of holes 44 to permit the panel to be secured in place with anchor bolts 46 and 48. A top plate 50 may be included along the top of the sill plate 52.

Corner gussets 54 may be placed along the front edges of the panel 20 and welded to the anchor plates 40 and 42 and the side panels 28 and 30 to reinforce the panel 20 and limit deflections.

The completed panel 20 may be left as uncoated metal or may be painted or otherwise coated. The panel 20 may be made from ¼" to ½" steel plate.

A safe room may be constructed by installing structural reinforcing panels 20 between each of the framing members 37 of a room. In the preferred embodiment for a safe room, the back panel 22 is solid with no cutouts to prevent projectiles from traveling through the wall and cutout. The panels 20 may be installed in the walls and ceiling, preferably on the first floor of a structure. The ceiling panels may be bolted directly to the header or top plate of the wall. The ceiling panels may be fabricated to span the width of the room. Alternatively, two or more panels 20 may be bolted together end-to-end to span the width of the room.

Referring to FIG. 5, another embodiment of a structural reinforcing panel is generally indicated by reference numeral 60. Panel 60 includes a back plate 62, side panels 64 and 66 formed by folding the back panel 62 along fold lines 68 and 70, and anchor panels 72 and 74 formed by folding back panel 62 along fold lines 76 and 78. The anchor panels 72 and 74 are then welded along the corner intersections with side panels 64 and 66. Corner gussets 80 are welded into the corners of the panel 60 to provide additional lateral stability and strength.

Referring to FIG. 6, two structural reinforcing panels 20 may be connected together in a corner 82 to reinforce the corner of the structure. A length of angle iron 84 is positioned behind the corner studs 86 and 88. Bolts 90 extend through apertures in the angle iron 84 through apertures in the studs 86 and 88 and panels 20. Once the bolts 90 are tightened, the panels 20 form a rigid structurally reinforced corner which provides both uplift and lateral sheer strength to the structure.

Referring to FIGS. 7 and 8, a panel mount 100 may be used to secure structural reinforcing panel 20 to the building structure 102 when anchoring through the sill plate is not possible (See FIG. 3). Panel mount 100 is a steel plate with holes for bolts 104 and 106. Bolts 104 connect the panel mount 100 to panel 20. Bolts 106 secure the panel mount 100 to the header 108. The panel mount 100 may be installed at either the top or bottom of the structural reinforcing panel 20 as needed.

Referring to FIGS. 9 and 10, an extended panel mount 110 may be used to secure structural reinforcing panels 20A and 20B between a floor 112. The extended panel mount 110 is bolted to the top portion of one structural reinforcing panel 20A, to the header 114 and to the lower portion of the upper structural reinforcing panel 20B.

Referring to FIGS. 11 and 11A, a top plate truss mount is generally indicated by reference numeral 120. Top plate truss mount 120 is placed on the top plate 122 of wall 124. Top plate truss mount 120 includes a series of spaced apart vertical straps 126 with apertures 128. The vertical straps 126 may be spaced according to the required truss 130 spacing. The truss 130 is bolted or otherwise fastened to the vertical straps 126 through apertures 128. Top plate truss mount 120 also includes a plurality of apertures 132, which are aligned with the apertures 44 (see FIGS. 1, 3 and 4) in panel 20. The top plate truss mount 120 is bolted to the structural reinforcing panel 20 and may also be fastened to the top plate 122 to prevent uplift of the roof under high wind conditions.

One or more brackets 140 may be used along the top plate to secure the truss 130 to the top plate 122 of wall 124. Top plate truss mount bracket 140 includes a plurality of apertures 142, which are aligned with the apertures 44 (see FIGS. 1, 3 and 4) in panel 20. The truss 130 is bolted or otherwise fastened to the vertical straps 144 through apertures 146. The top plate truss mount bracket 140 is fastened to the structural reinforcing panel 20 and top plate 122 to prevent uplift of the roof under high wind conditions.

The structural reinforcing panels 20 may be used individually in a wall or may be used as multiples depending on the lateral shear and uplift requirements of the structure. By connecting two or more panels 20 together the lateral shear and uplift loads that the structure can handle is greatly increased. The panel 20 may be sized to fit within the spacing of the frame members in both width and height.

Installation of the structural reinforcing panels 20 in a single or multi-story structure reduces the need for additional sheathing and other bracing materials needed to build in various code municipalities and can increase the shear and uplift values from 35% to 96% depending on the number of panels 20 used.

Referring to FIGS. 12 and 13, a pier mount plate 147 may be used to anchor the structure reinforcing panel 20 to a pier 149. The pier mount plate 147 includes a front plate 151, a back plate 153, a bottom plate 148 and a pair of gussets 150 and 152. Bottom 148 and gussets 150 and 152 are welded together and then welded to front plate 151. The front 151 and back 153 plates are bolted to the pier 149. An anchor bolt or threaded rod 154 extends from a structural reinforcing panel 20 through the floor joist 156 to the bottom plate 148.

Referring to FIG. 14, a double pier mount plate 160 may be used to anchor two structural reinforcing panels 20 to a pier 149. The double pier mount plate 160 includes opposed plates 162 and 164 each having a bottom plate 166 and 168 and a pair of gussets 170 and 172.

Figure 21:
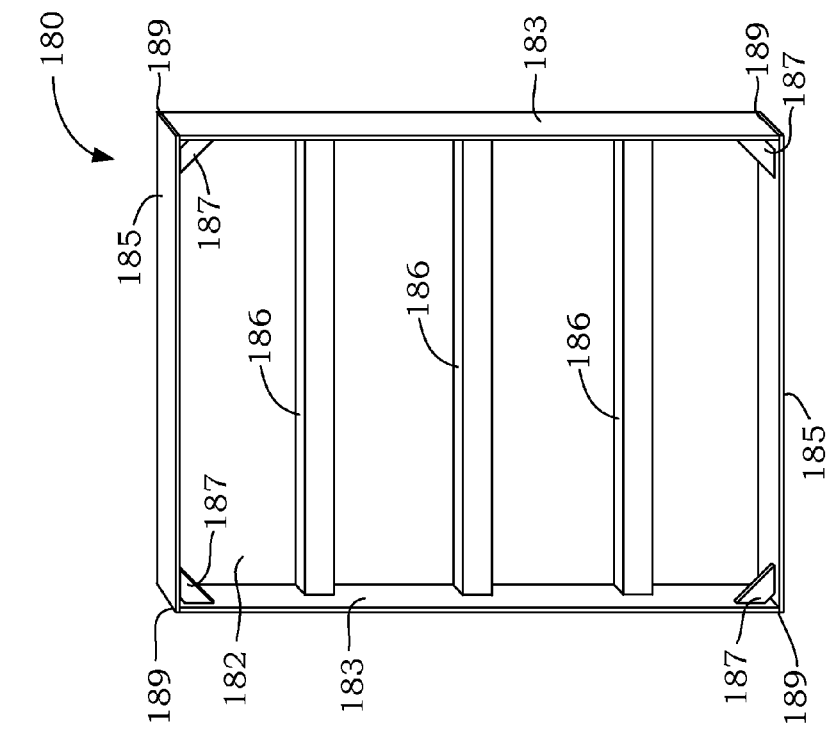
FIG. 21 is a front view of the structural reinforcing panel of FIG. 20 formed and assembled.
Figure 20:
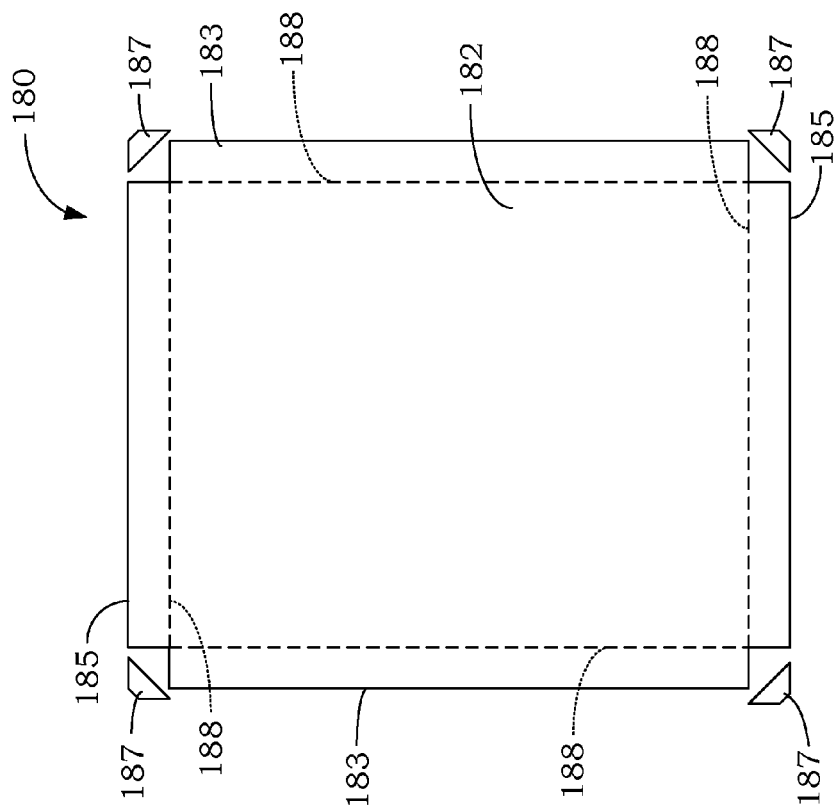
FIG. 20 is a plan view of a movable reinforcing panel of the present invention prior to assembly.

Additional embodiments of the invention are shown in FIGS. 15-23. FIG. 15 illustrates two movable reinforcing panels 180 configured to move horizontally to cover window 181. Movable panel 180 is similar in construction to structural reinforcing panel 20 in that it may be formed from cold or hot rolled steel and comprises some of the same parts as panel 20. A notable difference between the two panels is that movable panel 180 lacks the cutouts 32 and 34 of panel 20. FIGS. 20 and 21 best illustrate the parts of movable panel 180 which includes a back panel 182, side appendages 183, upper and lower appendages 185, reinforcing members or ribs 186, and optional corner gussets 187. Side appendages 183 and upper and lower appendages 185 may be formed integrally to back panel 182 and folded along lines 188 as shown, or they could be formed separately from the back panel 182 and welded to the back panel so that the appendages project from the back panel toward the front of movable panel 180. After the side appendages and upper and lower appendages have been arranged perpendicular to the back panel 182, either by folding or welding, the appendages are welded to each other at the corners 189 of movable panel 180. Corner gussets 187 may be welded to the appendages as shown if necessary to further reinforce movable panel 180 and limit deflections.

Movable panel 180 also has reinforcing members or ribs 186 spanning the front of back panel 180 in either a horizontal or vertical direction. Ribs 186 are welded to the back panel 180 and side appendages 183 (if ribs are horizontal) or upper and lower appendages 185 (if ribs are vertical). Ribs 186 are usually constructed of at least 3/16" thick steel plates fashioned in the shape of elongated bars, however it is understood that various materials and shapes may be used for the ribs. It is foreseen that the side appendages 183 or upper and lower appendages 185 may also comprise access openings for electrical wiring or piping in certain applications.

Each movable panel 180 is mounted on set of tracks comprising a lower track 190 and an upper track 192. The tracks are positioned at the bottom and top of window 181. The tracks may be mounted even with the periphery 193 of the window or set back from the window so they do not obstruct any portion of the window opening 194. Tracks 190 and 192 each form a channel 195, each channel having a trough 197 and two sidewalls 200. The top periphery 205 and bottom periphery 210 of each panel 180 are received within the channels 195 of each track 192 and 190 respectively. The peripheries 205 and 210 of panels 180 are contained between sidewalls 200 of each track such that the movement of the panels is constrained by the tracks and movement can only occur along the tracks.

Each track may be mounted to the framing members or support structure 212 surrounding window 181 by using mounting bracket 215 which is either fixedly attached to the track or integrally formed with the track. Mounting bracket 215 is mounted to support structure 212 using fasteners 220 such as lag bolts. It is foreseen that mounting bracket 215 may be mounted to wood or metal framing members, other reinforced panels, concrete structure or any other material which frames window 181 or surrounds window opening 194. The type of fasteners 220 used to attach mounting bracket 215 will depend on the material to which it is attached and fasteners appropriate for such application will be used. Mounting bracket 215 includes a plurality of receiving holes (not shown) through which fasteners 220 are routed to attach the mounting bracket and corresponding track to support structure 212. Depending on the configuration of the support structure 212 around window 181, the tracks may be mounted without the use of a mounting bracket 215 as shown in FIG. 15.

It is foreseen that each movable panel 180 may utilize one or more contact mechanisms for contacting tracks 190 and 192 to assist in movement of the panel along the tracks. The contact mechanism may be a glide block, wheel, roller, ball bearing or other device that reduces the force required to move panel 180 along the tracks. The contact mechanism shown in FIGS. 17 and 18 is a plastic glide block 225 attached to the bottom periphery 210 of panel 180. The glide block 225 contacts trough 197 of lower track 190 and slides along the track as panel 180 is moved. Glide block 225 is useful to reduce the force required to move panel 180 because the glide block has a lower coefficient of friction with respect to the track than the panel does. Therefore, because the friction between track 190 and glide block 225 is less than the friction that would exist if panel 180 contacted the track directly, less force is required to overcome friction and move the panel when glide block 225 is used. As mentioned above, contact mechanisms other than a glide block may be used and such mechanisms would similarly be attached to the bottom periphery 210 of panel 180 and contact trough 197 of lower track 190. Additionally, multiple contact mechanisms may be used on a single panel 180 and they may be the same or different types of mechanisms (e.g., rollers and glide blocks may be used in combination). If necessary, contact mechanisms may also be used on the top periphery 205 of a panel to contact track 192.

Panel 180 is moved along the tracks by force exerted on the panel in the direction the panel is to move. It is foreseen that this force can come from a person or a machine. Panel 180 is usually retracted from window opening 194 and stored in a pocket or cavity in a finished wall (not shown) on either side of the window until the panel is used. When the movable panel is used to barricade a window opening 194, the panel is moved and locked into place. As will be discussed in more detail below, if the window opening 194 is sized such that only one movable panel 180 is used to cover it, the panel is locked into place by engaging a locking mechanism 230 against a strike plate (not shown). If two or more movable panels 180 are used to barricade a window, the panels are locked into place against each other by engaging locking mechanism 230 on one of the panels with openings 237 formed in the another panel. If movable panels 180 are locked into place against one another, the panels move toward each other from opposite sides of the window opening 194 and will meet at a location proximate the middle of the window opening 194. A stop 238 is located in at least one of the tracks 190 and 192 at the location the panels 180 will meet to prevent a panel from overshooting the location. Locking mechanism 230 may be used on both horizontally and vertically moving panel installations notwithstanding the fact that the figures herein only show the locking mechanism being used on horizontally moving panels. It is foreseen that other methods of locking the panels in place may also be used.

The locking mechanism 230 comprises two vertical members or bars, locking member 240 and stationary member 245, which are positioned adjacent one another. The stationary member 245 is mounted proximate the leading edge, or the edge that would contact a strike plate or openings 237, of movable panel 180. Pivotally attached to stationary member 245 are one or more engaging hooks 250 which are used to latch onto a strike plate or opening 237 when locking member 240 is engaged. Engaging hook 250 has a latching end 251 and a pivotal end 252. Hook 250 is attached to stationary member 245 via a pin 255 inserted proximate the middle of the hook. Each engaging hook 250 is also attached to locking member 240 via a pin 256 inserted through the hook's pivotal end 252. Hook 250 is oriented so the latching end 251 extends away from locking member 240 and stationary member 245. In use, stationary member 245 is stationary with respect to movable panel 180 and locking member 240 moves vertically with respect to stationary member 245. When engaging hook 250 is angled upward while in the process of engaging a strike plate or openings 237, locking member 240 is moved downward with respect to the stationary member 245, and when the hook moves downward into a horizontal or engaged position the stationary member 245 moves upward to its resting position. Locking member 240 is biased in the upward position by spring 260 which is attached to locking member 240 and stationary member 245, thus causing hook 250 to be biased in a horizontal or engaged position.

As mentioned above, locking mechanism 230 is received by either a strike plate or openings 237. When movable panel 180 is locked in place the latching end 251 of hook 250 engages a retainer edge 265 of a strike plate or openings 237. When latching end 251 is engaged with retainer edge 265, panel 180 is locked in place. Because of the bias created by spring 260, locking mechanism 230 is normally in an engaged position with hook 250 oriented horizontally. Therefore, in order for the latching end 251 to move over retainer edge 265, the leading edge 270 of the latching end is curved or tapered so that latching end 251 slides up and over edge 265. The trailing edge 275 of latching end 251 is vertical to engage retainer edge 265 and lock panel 180 in place. Because there may be a small gap between the movable panel 180 and the strike plate 235 or another panel 180 when a panel is locked, a shielding plate 277 may be fixedly attached by welding or the like to movable panel 180 to block the gap.

Figure 16:
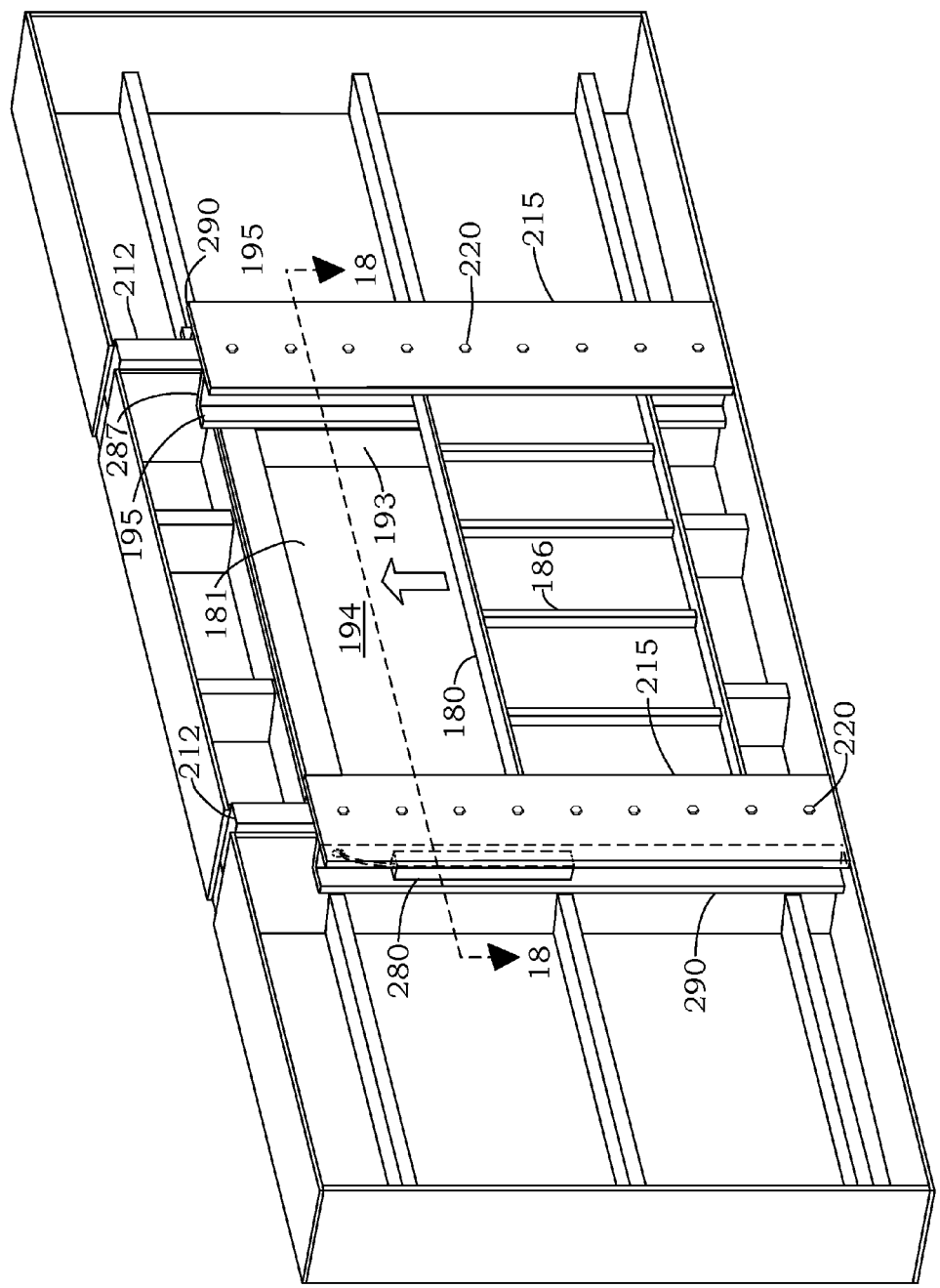
FIG. 16 is a perspective view of a movable reinforcing panel configured to move vertically to cover a window.

As shown in FIG. 16, it is understood that movable panel 180 may be installed to move vertically rather than horizontally as described above. A vertically moving panel installation would be similar to the described horizontal configuration except the installation would be rotated ninety degrees. For example, tracks 190 and 192 would be located on the sides of window 181, and panel 180 would usually be stored in a pocket or cavity in a finished wall (not shown) either above or below the window until the panel is used. Also, in a vertical configuration, if a contact mechanism such as glide block 225 were to be used it would likely be used for both tracks rather than just one track which is typical for a horizontal installation.

A significant distinction between a vertical configuration and horizontal configuration is that the vertical configuration may use counterweights 280 to assist in moving panel 180. Because the entire weight of movable panel 180 must be lifted to move the panel in a vertical configuration, if the panel is to be moved solely by human force the addition of counterweights 280 is preferable. As shown in FIGS. 16 and 18, vertical tracks 285 and 287 would be used if counterweights 280 are employed. Vertical tracks 285 and 287 are similar to the horizontal tracks 190 and 192 discussed above except the vertical tracks comprise counterweight housings 290. Similar to the horizontal tracks, each vertical track has a channel 195 for receiving the periphery of a panel 180. The counterweight housings 290 on each vertical track are formed by sides 295 and 296 extending from the back of channel 195. Counterweights 280 are contained within housings 290 and attached to panel 180 using a cord and pulley system of the type commonly used to lift objects with counterweights. The size and weight of counterweights 280 depend on the size and weight of the movable panel 180 being counterweighted. The counterweights 280 should be heavy enough to allow a single person to operate the movable panel 180 with assistance from the counterweight system.

Variations of the movable panel 180 installations described above are foreseen. Such panels can be used to cover any type of opening in the structure of a building where the opening needs to remain uncovered except in emergencies. This could include heating and ventilation openings, skylights, windows, doorways, passageways, etc. . . . . The method of sliding one or more panels 180 on tracks and locking them in place is not limited to the horizontal or vertical orientations described above, but may also be used on ceilings, floors and inclines. Also, the building structure surrounding the openings to be barricaded by panels 180 may be protected with a structural reinforcing panel 20 or non-movable versions of panel 180.

An additional feature of the present invention is the ability to telescope multiple movable panels 180 within one another to conserve storage space for the panels. As shown in FIGS. 22 and 23 it is foreseen that panels 180 can be arranged to interlock or link together when moved into place to barricade an opening and collapse into one another when the panels are not in use. A telescoping arrangement of the panels involves orienting adjacent panels 180 so that they are flipped with respect to each other. In other words, the back panel 182 of each adjacent panel 180 would be on opposite sides of the track shared by the panels and the ribs 186 would be visible on opposing sides of the adjacent panels 180. The modifications required to achieve an interlocking and telescoping relationship involve offsetting the ribs 186 on each adjacent telescoping panel 180 such that the panels can slide against each other without the ribs 186 interfering. Additionally, indentations or notches 300 are cut in side appendages 183 of adjacent panels 180 so that the upper and lower appendages 185 and ribs 186 of each panel can be accepted by an adjacent interlocking panel 180. Movable panels 180 become interlocked by each panel's side appendages 183 catching on the side appendage 183 of the adjacent panel when the panels are moved into place.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is as follows:

1. In combination with a building having a wood-frame structure comprising spaced-apart studs, sill plates, footings, ceiling and floor joists, and a roof with rafters, a structural reinforcing panel system comprising:

a structural reinforcing panel comprising a rectangular back panel having a top, bottom, and longitudinal sides, a pair of rectangular side panels attached along said longitudinal sides of said rectangular back panel, a first anchor plate secured to said top of said rectangular back panel and a top edge of each of said pair of rectangular side panels, a second anchor plate secured to said bottom of said rectangular back panel and a bottom edge of each of said pair of rectangular side panels, each of said rectangular side panels having a plurality of apertures for receiving fasteners therethrough securing the structural reinforcing panel to a structure;

said structural reinforcing panel configured to be fitted between and fastened to a pair of studs in the structure;

a movable reinforcing panel comprising a rectangular back panel having a top, bottom, and longitudinal sides, a pair of rectangular side appendages attached along said longitudinal sides of said rectangular back panel, an upper appendage secured to said top of said rectangular back panel and a top edge of each of said pair of side appendages, a lower appendage secured to said bottom of said rectangular back panel and a bottom edge of each of said pair of side appendages, at least one reinforcing member spanning said back panel; and at least one track along which said movable reinforcing panel can move, said movable reinforcing panel being movable for the purpose of forming a barricade at a location;

wherein said structural reinforcing panel is constructed of steel plate; and wherein said movable reinforcing panel is constructed of steel plate.

2. The combination set forth in claim 1 wherein said movable reinforcing panel is for barricading a window.

3. The combination set forth in claim 2 further comprising a locking mechanism to lock said movable reinforcing panel in a position.

4. The combination set forth in claim 1 wherein said movable reinforcing panel has a glide block to assist in moving said movable reinforcing panel along said track.

5. The combination set forth in claim 1 wherein said movable reinforcing panel has a wheel or roller to assist in moving said movable reinforcing panel along said track.

6. The combination set forth in claim 1 wherein a plurality of said movable reinforcing panels are interlocked together such that at least one of said movable reinforcing panels collapses into another said movable reinforcing panel when said plurality of movable reinforcing panels are not used to form a barricade.

\* \* \* \* \*